United States Patent
Gui et al.

(10) Patent No.: US 10,721,688 B2
(45) Date of Patent: Jul. 21, 2020

(54) POWER CONSUMPTION CONTROL METHOD FOR WEARABLE DEVICE, AND WEARABLE DEVICE

(71) Applicant: HUAWEI TECHNOLOGIES CO., LTD., Shenzhen (CN)

(72) Inventors: Yonglin Gui, Xi'an (CN); Haifeng Lin, Xi'an (CN); Yang Zhao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/308,359

(22) PCT Filed: Jun. 12, 2015

(86) PCT No.: PCT/CN2015/081314
§ 371 (c)(1),
(2) Date: Nov. 1, 2016

(87) PCT Pub. No.: WO2016/197383
PCT Pub. Date: Dec. 15, 2016

(65) Prior Publication Data
US 2018/0098286 A1    Apr. 5, 2018

(51) Int. Cl.
*H04W 52/02* (2009.01)
*H04M 1/725* (2006.01)
(Continued)

(52) U.S. Cl.
CPC ........ *H04W 52/0235* (2013.01); *G04G 21/02* (2013.01); *G04G 21/04* (2013.01);
(Continued)

(58) Field of Classification Search
CPC ..... G04B 47/00; G06F 1/3203; G06F 1/3278; G06F 1/3287; G06F 11/3013;
(Continued)

(56) References Cited

U.S. PATENT DOCUMENTS

| 7,539,519 B2 | 5/2009 | Ko et al. |
| 2004/0077349 A1 | 4/2004 | Barak et al. |

(Continued)

FOREIGN PATENT DOCUMENTS

| CN | 1805578 A | 7/2006 |
| CN | 102783323 A | 11/2012 |

(Continued)

OTHER PUBLICATIONS

European search report dated Jul. 20, 2017 in the European corresponding application (application No. 15888729.9).
(Continued)

*Primary Examiner* — Jaweed A Abbaszadeh
*Assistant Examiner* — Brian J Corcoran
(74) *Attorney, Agent, or Firm* — Kilpatrick Townsend & Stockton LLP

(57) ABSTRACT

The present invention provides a power consumption control method for a wearable device, and a wearable device. The method includes: receiving, when a modem of a wearable device is in an off state, remote wireless communication service information transmitted by a terminal through short range communications; or receiving, by a wearable device when a modem of the wearable device is in an on state, content, sent by a network device, of the remote wireless communication service. With the method provided in the present invention, a standby time of the wearable device is prolonged.

19 Claims, 8 Drawing Sheets

(51) Int. Cl.
| | |
|---|---|
| *H04M 19/08* | (2006.01) |
| *G04G 21/02* | (2010.01) |
| *G04G 21/04* | (2013.01) |
| *H04B 1/3827* | (2015.01) |
| *H04L 12/54* | (2013.01) |
| *H04W 4/021* | (2018.01) |
| *H04W 4/02* | (2018.01) |
| *H04W 84/04* | (2009.01) |

(52) U.S. Cl.
CPC ......... *H04B 1/385* (2013.01); *H04L 12/5692* (2013.01); *H04M 1/725* (2013.01); *H04M 1/7253* (2013.01); *H04M 19/08* (2013.01); *H04W 4/021* (2013.01); *H04W 4/027* (2013.01); *H04W 52/02* (2013.01); *H04W 84/042* (2013.01); *Y02D 70/00* (2018.01); *Y02D 70/142* (2018.01); *Y02D 70/144* (2018.01); *Y02D 70/162* (2018.01); *Y02D 70/166* (2018.01); *Y02D 70/20* (2018.01); *Y02D 70/26* (2018.01)

(58) Field of Classification Search
CPC ... G06F 11/3058; H04B 1/385; H04B 1/3827; H04B 2001/3855; H04B 2001/386; H04B 5/00; H04L 12/569; H04M 1/7253; H04M 2250/02; H04M 2250/06; H04M 2250/12; H04W 28/022; H04W 4/80; H04W 52/0235; H04W 84/12; H04W 88/06; Y02D 10/157; Y02D 10/171; Y02D 70/142; Y02D 70/144; Y02D 70/26; Y02D 70/1262; Y02D 70/146; Y02D 70/162; Y02D 70/164; Y02D 70/166; Y02D 70/23; Y02D 70/00; Y02D 70/1224; Y02D 70/1242; Y02D 70/1244; Y02D 70/1222; Y02D 70/1246; Y02D 70/40

See application file for complete search history.

(56) References Cited

U.S. PATENT DOCUMENTS

| | | |
|---|---|---|
| 2006/0126582 A1 | 6/2006 | Saifullah et al. |
| 2007/0265009 A1 | 11/2007 | Hamaguchi |
| 2011/0268000 A1 | 11/2011 | Kashikar et al. |
| 2014/0106677 A1 | 4/2014 | Altman |
| 2014/0141718 A1 | 5/2014 | Stromberg et al. |
| 2014/0194064 A1 | 7/2014 | Murakami |
| 2014/0298353 A1* | 10/2014 | Hsu .................... G06F 9/54 719/313 |
| 2015/0131502 A1 | 5/2015 | Narasimha et al. |
| 2015/0134833 A1 | 5/2015 | Kim et al. |
| 2015/0163744 A1 | 6/2015 | Suh et al. |
| 2015/0245186 A1* | 8/2015 | Park .................... H04W 4/80 455/417 |
| 2015/0281943 A1 | 10/2015 | Iwamoto |
| 2016/0057268 A1 | 2/2016 | Jiang |
| 2019/0044559 A1 | 2/2019 | Altman |

FOREIGN PATENT DOCUMENTS

| | | |
|---|---|---|
| CN | 102823320 A | 12/2012 |
| CN | 103399483 A | 11/2013 |
| CN | 103901769 A | 7/2014 |
| CN | 104035543 A | 9/2014 |
| CN | 104469662 A | 3/2015 |
| CN | 104506204 A | 4/2015 |
| CN | 104679219 A | 6/2015 |
| EP | 1753254 A1 | 2/2007 |
| EP | 2860951 A1 | 4/2015 |
| EP | 2988219 A1 | 2/2016 |
| JP | 2000069149 A | 3/2000 |
| JP | 2002009879 A | 1/2002 |
| JP | 2002152327 A | 5/2002 |
| JP | 2007306201 A | 11/2007 |
| JP | 2008263277 A | 10/2008 |
| JP | 2009182656 A | 8/2009 |
| JP | 2014134903 A | 7/2014 |
| JP | 2014135540 A | 7/2014 |
| JP | 2014165781 A | 9/2014 |
| JP | 2015041829 A | 3/2015 |
| JP | 2016507912 A | 3/2016 |
| KR | 20000054732 A | 9/2000 |
| KR | 20110006201 A | 1/2011 |
| KR | 20120059709 A | 6/2012 |
| KR | 101295761 B1 | 8/2013 |
| KR | 20150010005 A | 1/2015 |
| KR | 20150024234 A | 3/2015 |
| KR | 20150042486 A | 4/2015 |
| WO | 2014061600 A1 | 4/2014 |
| WO | 2014062714 A1 | 4/2014 |

OTHER PUBLICATIONS

Official Notice of Rejection dated Dec. 12, 2017 in the corresponding Japanese Patent Application (application No. 2016-569062).

* cited by examiner

POWER CONSUMPTION CONTROL METHOD FOR WEARABLE DEVICE, AND WEARABLE DEVICE

CROSS-REFERENCE TO RELATED APPLICATIONS

This application is a National Stage of International Application No. PCT/CN2015/081314, filed on Jun. 12, 2015, which is hereby incorporated by reference in its entirety.

TECHNICAL FIELD

The present invention relates to the field of communications technologies, and in particular, to a power consumption control method for a wearable device, and a wearable device.

BACKGROUND

A wearable device is a generic name for devices that are wearable and that are developed by applying a wearable technology to intelligent design for daily wear, such as smart glasses, smart gloves, smart watches, smart clothing, or smart shoes. Among the devices, a smart watch and a smart band are most notable. In addition, with the rapid development of a smart wearable device, a function of the wearable device becomes increasingly stronger. At the same time when the function develops, power consumption also increases quickly for the wearable device, especially for a wearable device with a wireless data communication function. Because power consumption of a wireless network functional module, which is in a static standby state, in the wearable device is relatively high, a standby time of the wearable device is reduced. In addition, because a size of the wearable device is limited, it is impossible to improve a battery life of a product by unlimitedly increasing a battery capacity. Therefore, an energy-saving technology becomes a key technology direction for the development of the wearable device.

However, in the prior art, there is no corresponding technical solution for how to prolong the standby time of the wearable device (that is, a battery life of the wearable device). Therefore, how to reduce the power consumption of the wearable device to prolong the standby time of the wearable device currently becomes a technical problem to be urgently resolved.

SUMMARY

Embodiments of the present invention provide a power consumption control method for a wearable device, and a wearable device, to resolve a prior-art technical problem that a standby time of a wearable device cannot be effectively prolonged.

According to a first aspect, the present invention provides a power consumption control method for a wearable device, where the method includes:

receiving, by the wearable device when a modem of the wearable device is in an off state, remote wireless communication service information transmitted by a terminal through short range communications, where the remote wireless communication service information includes a prompt message of a remote wireless communication service or content of a remote wireless communication service, and the prompt message of the remote wireless communication service is used to prompt a user to determine whether to turn on the modem; or receiving, by the wearable device when a modem of the wearable device is in an on state, content, sent by a network device, of the remote wireless communication service.

With reference to the first aspect, in a first possible implementation manner of the first aspect, when the remote wireless communication service information includes the prompt message of the remote wireless communication service, after the receiving, by the wearable device when a modem of the wearable device is in an off state, remote wireless communication service information transmitted by a terminal through short range communications, the method includes:

when the modem of the wearable device is in the off state, activating, by the wearable device, the modem according to a selection instruction entered by the user, where the selection instruction is an instruction for selectively activating the modem that is entered by the user according to the prompt information of the remote wireless communication service; and processing, by the wearable device and by using the modem, the received content of the remote wireless communication service.

With reference to the first aspect, in a second possible implementation manner of the first aspect, when the remote wireless communication service information includes the content of the remote wireless communication service, after the receiving, by the wearable device when a modem of the wearable device is in an off state, remote wireless communication service information transmitted by a terminal through short range communications, the method includes:

transmitting, by the wearable device and through the short range communications, reply information of the content of the remote wireless communication service to the terminal, so that the terminal sends the reply information to the network device, where the reply information is information replied by the user on the wearable device according to the content of the remote wireless communication service.

With reference to any one of the first aspect, or the first and the second possible implementation manners of the first aspect, in a third possible implementation manner of the first aspect, before the receiving, by the wearable device when a modem of the wearable device is in an off state, remote wireless communication service information transmitted by a terminal through short range communications, the method includes:

sending, by the wearable device and through the short range communications, an instruction of starting specified communication software to the terminal, to instruct the terminal to start, according to the instruction, the specified communication software or to prompt the user to start the specified communication software, so the terminal receives a new message of the specified communication software and forwards the new message to the wearable device.

With reference to any one of the first aspect, or the first to the third possible implementation manners of the first aspect, in a fourth possible implementation manner of the first aspect, the content of the remote wireless communication service is sent by the network device to the terminal according to an information transfer setting of the wearable device.

With reference to any one of the first aspect, or the first to the third possible implementation manners of the first aspect, in a fifth possible implementation manner of the first aspect, the content of the remote wireless communication service is sent by the network device to the terminal according to a user name of registered communication software.

According to a second aspect, an embodiment of the present invention provides a wearable device, including:

a control module, configured to control, when a modem of the wearable device is in an off state, a receiver to receive remote wireless communication service information transmitted by a terminal through short range communications, where the remote wireless communication service information includes a prompt message of a remote wireless communication service or content of a remote wireless communication service, and the prompt message of the remote wireless communication service is used to prompt a user to determine whether to turn on the modem; where the control module is further configured to control, when the modem of the wearable device is in an on state, the receiver to receive the content, sent by a network device, of the remote wireless communication service.

With reference to the second aspect, in a first possible implementation manner of the second aspect, when the remote wireless communication service information includes the prompt message of the remote wireless service, the wearable device further includes:

a switch module, configured to: after the control module controls, when the modem of the wearable device is in the off state, the receiver to receive the remote wireless communication service information transmitted by the terminal through the short range communications, turn on the modem according to a selection instruction entered by the user, where the selection instruction is an instruction for selectively activating the modem that is entered by the user according to the prompt information of the remote wireless communication service; where the control module controls the modem to process the content, received by the receiver, of the remote wireless communication service.

With reference to the second aspect, in a second possible implementation manner of the second aspect, when the remote wireless communication service information includes the content of the remote wireless communication service, the control module is further configured to: after controlling, when the modem of the wearable device is in the off state, the receiver to receive the remote wireless communication service information transmitted by the terminal through the short range communications, control a transmitter to transmit, through the short range communications, reply information of the content of the remote wireless communication service to the terminal, so that the terminal sends the reply information to the network device, where the reply information is information replied by the user on the wearable device according to the content of the remote wireless communication service.

With reference to any one of the second aspect, or the first to the second possible implementation manners of the second aspect, in a third possible implementation manner of the second aspect, the control module is further configured to: before controlling, when the modem of the wearable device is in the off state, the receiver to receive the remote wireless communication service information transmitted by the terminal through the short range communications, control the transmitter to send, through the short range communications, an instruction of starting specified communication software to the terminal, to instruct the terminal to start, according to the instruction, the specified communication software or to prompt the user to start the specified communication software, so the terminal receives a new message of the specified communication software and forwards the new message to the wearable device.

With reference to any one of the second aspect, the first to the third possible implementation manners of the second aspect, in a fourth possible implementation manner of the second aspect, the content of the remote wireless communication service is sent by the network device to the terminal according to an information transfer setting of the wearable device.

With reference to any one of the second aspect, or the first to the third possible implementation manners of the second aspect, in a fifth possible implementation manner of the second aspect, the content of the remote wireless communication service is sent by the network device to the terminal according to a user name of registered communication software.

According to a third aspect, an embodiment of the present invention provides a wearable device, including:

a processor, configured to control, when a modem of the wearable device is in an off state, a receiver to receive remote wireless communication service information transmitted by a terminal through short range communications, where the remote wireless communication service information includes a prompt message of a remote wireless communication service or content of a remote wireless communication service, and the prompt message of the remote wireless communication service is used to prompt a user to determine whether to turn on the modem; where the processor is further configured to control, when the modem of the wearable device is in an on state, the receiver to receive the content, sent by a network device, of the remote wireless communication service.

With reference to the third aspect, in a first possible implementation manner of the third aspect, when the remote wireless communication service information includes the prompt message of the remote wireless service, the processor is further configured to: after controlling, when the modem of the wearable device is in the off state, the receiver to receive the remote wireless communication service information transmitted by the terminal through the short range communications, turn on the modem according to a selection instruction entered by the user, where the selection instruction is an instruction for selectively activating the modem that is entered by the user according to the prompt information of the remote wireless communication service; and the processor is specifically configured to control the modem to process the content, received by the receiver, of the remote wireless communication service.

With reference to the third aspect, in a second possible implementation manner of the third aspect, when the remote wireless communication service information includes the content of the remote wireless communication service, the processor is further configured to: after controlling, when the modem of the wearable device is in the off state, the receiver to receive the remote wireless communication service information transmitted by the terminal through the short range communications, control a transmitter to transmit, through the short range communications, reply information of the content of the remote wireless communication service to the terminal, so that the terminal sends the reply information to the network device, where the reply information is information replied by the user on the wearable device according to the content of the remote wireless communication service.

With reference to any one of the third aspect, or the first to the second possible implementation manners of the third aspect, in a third possible implementation manner of the third aspect, the processor is further configured to: before controlling, when the modem of the wearable device is in the off state, the receiver to receive the remote wireless communication service information transmitted by the terminal through the short range communications, control the transmitter to send, through the short range communications, an instruction of starting specified communication software to the terminal, to instruct the terminal to start, according to the instruction, the specified communication software or to prompt the user to start the specified communication software, so the terminal receives a new message of the specified communication software and forwards the new message to the wearable device.

With reference to any one of the third aspect, or the first to the third possible implementation manners of the third aspect, in a fourth possible implementation manner of the third aspect, the content of the remote wireless communication service is sent by the network device to the terminal according to an information transfer setting of the wearable device.

With reference to any one of the third aspect, or the first to the third possible implementation manners of the third aspect, in a fifth possible implementation manner of the third aspect, the content of the remote wireless communication service is sent by the network device to the terminal according to a user name of registered communication software.

According to a fourth aspect, the present invention provides a power consumption control method for a wearable device, including:

transmitting, by a terminal and through short range communications, remote wireless communication service information to the wearable device whose modem is in an off state, where the remote wireless communication service information includes a prompt message of a remote wireless communication service or content of a remote wireless communication service, and the prompt message of the remote wireless communication service is used to prompt a user to determine whether to turn on the modem.

With reference to the fourth aspect, in a first possible implementation manner of the fourth aspect, the prompt information of the remote wireless communication service is used to enable the wearable device to turn on the modem according to a selection instruction entered by the user, and process, by using the modem, the content, received by the wearable device, of the remote wireless communication service, where the selection instruction is an instruction for selectively activating the modem that is entered by the user according to the prompt message of the remote wireless communication service.

With reference to the fourth aspect, in a second possible implementation manner of the fourth aspect, when the remote wireless communication service information includes the content of the remote wireless communication service, after the transmitting, by a terminal and through short range communications, remote wireless communication service information to the wearable device whose modem is in an off state, the method further includes:

receiving, by the terminal, reply information that is of the remote wireless communication service and that is transmitted by the wearable device through the short range communications, where the reply information is information replied by the user on the wearable device according to the content of the remote wireless communication service; and sending, by the terminal, the reply information to a network device.

With reference to any one of the fourth aspect, or the first to the second possible implementation manners of the fourth aspect, in a third possible implementation manner of the fourth aspect, before the transmitting, by a terminal and through short range communications, remote wireless communication service information to the wearable device whose modem is in an off state, the method further includes:

receiving, by the terminal, an instruction that is of starting specified communication software and that is sent by the wearable device through the short range communications;

starting, by the terminal and according to the instruction, the specified communication software, or prompting the user to start the specified communication software; and receiving, by the terminal, a new message of the specified communication software, and forwarding the new message of the specified communication software to the wearable device.

With reference to any one of the fourth aspect, or the first to the third possible implementation manners of the fourth aspect, in a fourth possible implementation manner of the fourth aspect, the content of the remote wireless communication service is sent by the network device to the terminal according to an information transfer setting of the wearable device.

With reference to any one of the fourth aspect, or the first to the third possible implementation manners of the fourth aspect, in a fifth possible implementation manner of the fourth aspect, the content of the remote wireless communication service is sent by the network device to the terminal according to a user name of registered communication software.

According to a fifth aspect, the present invention provides a terminal, including:

a control module, configured to control a transmitter to transmit, through short range communications, remote wireless communication service information to a wearable device whose modem is in an off state, where the remote wireless communication service information includes a prompt message of a remote wireless communication service or content of a remote wireless communication service, and the prompt message of the remote wireless communication service is used to prompt a user to determine whether to turn on the modem.

With reference to the fifth aspect, in a first possible implementation manner of the fifth aspect, the prompt information of the remote wireless communication service is used to enable the wearable device to turn on the modem according to a selection instruction entered by the user, and process, by using the modem, the content, received by the wearable device, of the remote wireless communication service, where the selection instruction is an instruction for selectively activating the modem that is entered by the user according to the prompt message of the remote wireless communication service.

With reference to the fifth aspect, in a second possible implementation manner of the fifth aspect, when the remote wireless communication service information includes the content of the remote wireless communication service, the control module is further configured to: after controlling the transmitter to transmit, through the short range communications, the remote wireless communication service information to the wearable device whose modem is in the off state, control a receiver to receive reply information that is of the remote wireless communication service and that is transmitted by the wearable device through the short range communications, where the reply information is information replied by the user on the wearable device according to the content of the remote wireless communication service; and the control module is further configured to control the transmitter to send the reply information to a network device.

With reference to the fifth aspect or the second possible implementation manner of the fifth aspect, in a third possible implementation manner of the fifth aspect, the terminal further includes a switch module, where the control module is further configured to: before controlling the transmitter to transmit, through the short range communications, the remote wireless communication service information to the wearable device whose modem is in the off state, control the receiver to receive an instruction that is of starting specified communication software and that is sent by the wearable device through the short range communications;

the switch module is configured to, according to the instruction, start the specified communication software or prompt the user to start the specified communication software; and the control module is further configured to control the receiver to receive a new message of the specified communication software, and control the transmitter to forward the new message of the specified communication software to the wearable device.

With reference to any one of the fifth aspect, or the first to the third possible implementation manners of the fifth aspect, in a fourth possible implementation manner of the fifth aspect, the content of the remote wireless communication service is sent by the network device to the terminal according to an information transfer setting of the wearable device.

With reference to any one of the fifth aspect, or the first to the third possible implementation manners of the fifth aspect, in a fifth possible implementation manner of the fifth aspect, the content of the remote wireless communication service is sent by the network device to the terminal according to a user name of registered communication software.

According to a sixth aspect, the present invention provides a terminal, including:

a processor, configured to control a transmitter to transmit, through short range communications, remote wireless communication service information to a wearable device whose modem is in an off state, where the remote wireless communication service information includes a prompt message of a remote wireless communication service or content of a remote wireless communication service, and the prompt message of the remote wireless communication service is used to prompt a user to determine whether to turn on the modem.

With reference to the sixth aspect, in a first possible implementation manner of the sixth aspect, the prompt information of the remote wireless communication service is used to enable the wearable device to turn on the modem according to a selection instruction entered by the user, and process, by using the modem, the content, received by the wearable device, of the remote wireless communication service, where the selection instruction is an instruction for selectively activating the modem that is entered by the user according to the prompt message of the remote wireless communication service.

With reference to the sixth aspect, in a second possible implementation manner of the sixth aspect, when the remote wireless communication service information includes the content of the remote wireless communication service, the processor is further configured to: after controlling the transmitter to transmit, through the short range communications, the remote wireless communication service information to the wearable device whose modem is in the off state, control a receiver to receive reply information that is of the remote wireless communication service and that is transmitted by the wearable device through the short range communications, where the reply information is information replied by the user on the wearable device according to the content of the remote wireless communication service; and the processor is further configured to control the transmitter to send the reply information to a network device.

With reference to the sixth aspect or the second possible implementation manner of the sixth aspect, in a third possible implementation manner of the sixth aspect, the processor is further configured to: before controlling the transmitter to transmit, through the short range communications, the remote wireless communication service information to the wearable device whose modem is in the off state, control the receiver to receive an instruction that is of starting specified communication software and that is sent by the wearable device through the short range communications; and the processor is further configured to, according to the instruction, start the specified communication software or prompt the user to start the specified communication software; and control the receiver to receive a new message of the specified communication software, and control the transmitter to forward the new message of the specified communication software to the wearable device.

With reference to any one of the sixth aspect, or the first to the third possible implementation manners of the sixth aspect, in a fourth possible implementation manner of the sixth aspect, the content of the remote wireless communication service is sent by the network device to the terminal according to an information transfer setting of the wearable device.

With reference to any one of the sixth aspect, or the first to the third possible implementation manners of the sixth aspect, in a fifth possible implementation manner of the sixth aspect, the content of the remote wireless communication service is sent by the network device to the terminal according to a user name of registered communication software.

According to the power consumption control method for a wearable device, and the wearable device that are provided in the embodiments of the present invention, when a modem of a wearable device is in an off state, remote wireless communication service information transmitted by a terminal through short range communications is received. Alternatively, when a modem of a wearable device is in an on state, content, sent by a network device, of a remote wireless communication service is received. That is, the wearable device may flexibly use, according to a status of the modem, a different manner of receiving the content of the remote wireless communication service. When the modem is in the off state, a manner of transparently transmitting the remote wireless communication service information by using the terminal prevents the modem of the wearable device from always being in a state of receiving the content, sent by the network device, of the remote wireless communication service, that is, prevents the modem from always being in a standby state or a working state, thereby reducing power consumption of the wearable device and prolonging a standby time of the wearable device.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
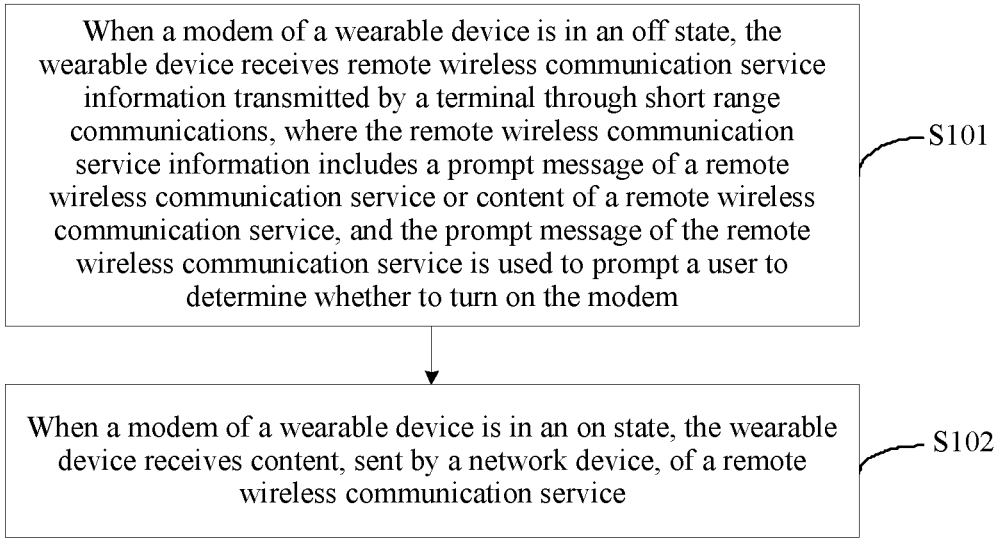
FIG. 1 is a schematic flowchart of Embodiment 1 of a power consumption control method for a wearable device according to the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A terminal involved in the embodiments of the present invention may include but is not limited to a mobile phone, a mobile computer, a tablet computer, a personal digital assistant (Personal Digital Assistant, PDA), a media player, and the like, or may include a device such as an automatic teller machine (Automatic Teller Machine, ATM for short). The embodiments of the present invention do not limit a form of the terminal.

A wearable device involved in the embodiments of the present invention may be a device such as a smart band, smart glasses, smart gloves, a smart watch, smart clothing, or smart shoes, where the device can be worn by a user, can process a corresponding service of the user, and can perform intelligent interaction with the user. The wearable device in the embodiments may include a modem that is used to perform remote wireless communication with a wireless network. For example, the modem may perform remote wireless communication with network-side a base station, mobility management entity, or the like, that is, receive and process content of a remote wireless communication service. The wearable device may further include a service processor that processes service data of the wearable device. The service data may include local data of the wearable device (for example, data collected by the wearable device, such as a body temperature and a heartbeat), may further include the content, obtained by the modem, of the remote wireless communication service, and may further include service data of near field communication that is obtained through short range communications, such as Bluetooth or Wireless Fidelity (Wireless-Fidelity, WiFi for short). Optionally, the modem and the service processor each may be an independent chip, or may be integrated in a processor chip. The embodiments of the present invention do not limit physical implementation forms of the modem and the service processor. Optionally, the modem may be a modem processor that can perform 2G, or 3G, or 4G wireless communication, and the service processor may integrate a function of WiFi, Bluetooth, or WiFi and Bluetooth.

A method involved in the embodiments of the present invention is aimed at resolving a prior-art technical problem that power consumption of a wearable device cannot be effectively reduced, and as a result, a standby time of the wearable device is short. It should be noted that the mentioned standby time of the wearable device in the embodiments of the present invention refers to a battery life of the wearable device.

The following describes in detail the technical solutions of the present invention by using specific embodiments. The following several specific embodiments may be combined with each other. Details of a same or similar concept or process may not be described in an embodiment.

FIG. 1 is a schematic flowchart of Embodiment 1 of a power consumption control method for a wearable device according to the present invention. This embodiment relates to a specific process in which a wearable device implement reduction of power consumption of the wearable device according to a status of a modem. As shown in FIG. 1, the method includes:

S101: When a modem of a wearable device is in an off state, the wearable device receives remote wireless communication service information transmitted by a terminal through short range communications, where the remote wireless communication service information includes a prompt message of a remote wireless communication service or content of a remote wireless communication service, and the prompt message of the remote wireless communication service is used to prompt a user to determine whether to turn on the modem.

S102: When a modem of a wearable device is in an on state, the wearable device receives content, sent by a network device, of the remote wireless communication service.

It should be noted that, in this embodiment, S101 and S102 are an overall technical characteristic and describe an overall working state of the wearable device at different circumstances, and therefore there is no limitation on a time sequence relationship between S101 and S102.

Specifically, in this embodiment, when the modem of the wearable device is in the off state, there is a communication connection between the wearable device and the terminal. Optionally, the wearable device may establish the communication connection with the terminal in advance and then deactivate the modem; or the wearable device may deactivate the modem and establish the communication connection with the terminal simultaneously. The foregoing communication connection between the wearable device and the terminal may be a near field communication connection (or a short range communications connection), for example, a near field communication connection established, by using the terminal as a WiFi hotspot, by the wearable device with the terminal by using a WiFi function; or a near field communication connection established by the wearable device with the terminal by means of Bluetooth pairing; or a near field communication connection established by the wearable device with the terminal by using a Zigbee protocol. In conclusion, the wearable device can establish the communication connection with the terminal by using any one of near field communication technologies, and transparent transmission of a data service can be implemented between the wearable device and the terminal. The foregoing manner of short range communications may be a Bluetooth communication manner, may be a WiFi or NFC communication manner, or may be another near field communication manner.

When the modem of the wearable device is in the off state, the terminal may detect a status of the modem of the wearable device, or the wearable device notifies the terminal of a current status of the modem in the manner of short range communications. After the terminal knows that the modem of the wearable device is in the off state, the terminal may notify the network device to send, to the terminal, the content that is of the remote wireless communication service and that should be originally sent to the wearable device; or when the modem of the wearable device is not turned off, the wearable device notifies the network device to send, to the terminal, the content that is of the remote wireless communication service and that should be originally sent to the wearable device.

After receiving the content of the remote wireless communication service, the terminal transmits the remote wireless communication service information to the wearable device through the short range communications, where the remote wireless communication service information includes the content of the remote wireless communication service or the prompt message of the remote wireless communication service, and the prompt message of the remote wireless communication service is used to prompt the user to determine whether to turn on the modem and is used to notify the wearable device of content, currently received by the terminal, of the remote wireless communication service. The user may select to turn on the modem so that the content of the remote wireless communication service is processed on the wearable device, or the user may select not to turn on the modem so that the content of the remote wireless communication service is processed on the terminal.

In another aspect, in this embodiment, when the modem of the wearable device is in the on state, the modem may receive the content, sent by the network device, of the remote wireless communication service.

In the prior art, a modem of a wearable device is in a state of receiving content, sent by a network device, of a remote wireless communication service in real time for a long time, that is, the modem of the wearable device is in a standby state or a working state for a long time, and as a result, power consumption of the wearable device is very large, and a standby time of the wearable device is short. However, in this embodiment of the present invention, the wearable device may flexibly use, according to a status of the modem, a different manner of receiving the content of the remote wireless communication service. When the modem is in an off state, a manner of transparently transmitting remote wireless communication service information by using a terminal prevents the modem of the wearable device from always being in the state of receiving the content, sent by the network device, of the remote wireless communication service, that is, prevents the modem from always being in the standby state or the working state, thereby reducing the power consumption of the wearable device and prolonging the standby time of the wearable device.

According to the power consumption control method for a wearable device provided in this embodiment of the present invention, when a modem of a wearable device is in an off state, remote wireless communication service information transmitted by a terminal through short range communications is received. Alternatively, when a modem of a wearable device is in an on state, content, sent by a network device, of the remote wireless communication service is received. That is, the wearable device may flexibly use, according to a status of the modem, a different manner of receiving the content of the remote wireless communication service. When the modem is in the off state, a manner of transparently transmitting the remote wireless communication service information by using the terminal prevents the modem of the wearable device from always being in a state of receiving the content, sent by the network device, of the remote wireless communication service, that is, prevents the modem from always being in a standby state or a working state, thereby reducing power consumption of the wearable device and prolonging a standby time of the wearable device.

Figure 2:
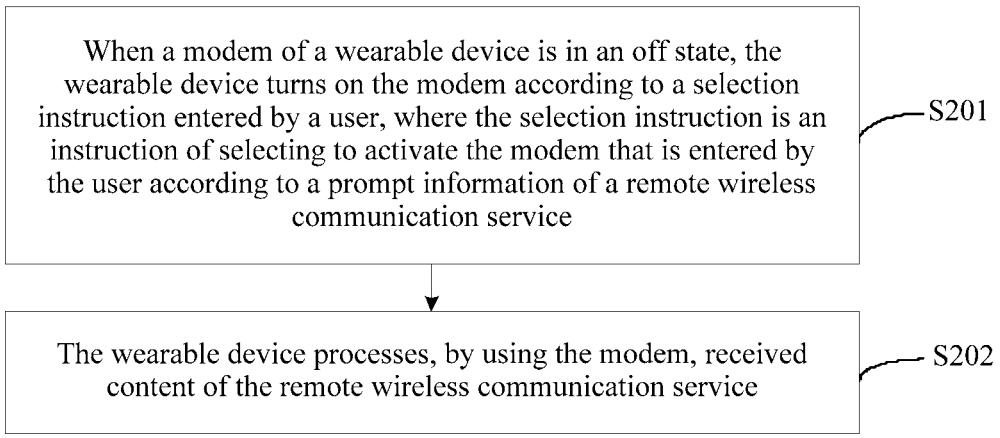
FIG. 2 is a schematic flowchart of Embodiment 2 of a power consumption control method for a wearable device according to the present invention.

FIG. 2 is a schematic flowchart of Embodiment 2 of a power consumption control method for a wearable device according to the present invention. This embodiment relates to a specific process in which, when a modem of a wearable device is in an off state and when the foregoing remote wireless communication service information is a prompt message of a remote wireless communication service, the wearable device receives content of the remote wireless communication service. On the basis of the foregoing embodiment, further, as shown in FIG. 2, after the foregoing S101, the method includes the following steps:

S201: When the modem of the wearable device is in the off state, the wearable device activates the modem according to a selection instruction entered by the user, where the selection instruction is an instruction for selectively activating the modem that is entered by the user according to the prompt information of the remote wireless communication service.

Figure 3:
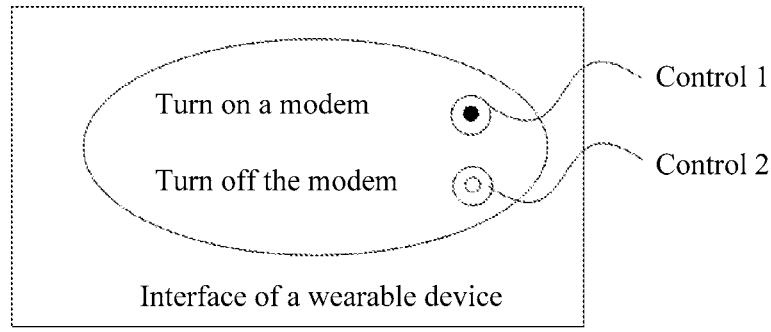
FIG. 3 is a schematic diagram of a prompt message of a remote wireless communication service according to the present invention.

Specifically, when the modem is in the off state, the wearable device receives the prompt message that is of the remote wireless communication service and that is transmitted by the terminal through the short range communications, where the prompt message is used to prompt the user to determine whether to turn on the modem and is used to notify the wearable device of content, currently received by the terminal, of the remote wireless communication service. According to the prompt message of the remote wireless communication service, the user may select to process the content of the remote wireless communication service on the wearable device, or select to process the content of the remote wireless communication service on the terminal. Optionally, the prompt message of the remote wireless communication service may be a message carrying an option control for the user to select. When the user selects to process the content of the remote wireless communication service on the wearable device, the user enters the selection instruction to the wearable device. Optionally, the selection instruction is related to an operation of the user. For example, it is assumed that the foregoing prompt message of the remote wireless communication service is a pop-up dialog box. Referring to a schematic diagram of a prompt message of a remote wireless communication service shown in FIG. 3, the dialog box includes two selection controls. After the user taps a different control, a different selection instruction is entered to the wearable device. When the user taps a control 1, a selection instruction that the user enters to the wearable device is used to instruct the wearable device to turn on the modem. FIG. 3 shows only an example. This embodiment of the present invention does not limit a form of the prompt message of the remote wireless communication service, as long as the user can make a selection.

S202: The wearable device processes, by using the modem, the received content of the remote wireless communication service.

Specifically, after the wearable device activates the modem, the wearable device may receive, by using the modem, the content, sent by a network device, of the remote wireless communication service, and may further process the content of the remote wireless communication service or process the content of the remote wireless communication service with a service processor inside the wearable device. Optionally, the content of the remote wireless communication service may be a wireless service such as an incoming call, a short message service message, or a multimedia messaging service message.

According to the power consumption control method for a wearable device provided in this embodiment of the present invention, when a modem of a wearable device is in an off state, a prompt message, received by the wearable device, of a remote wireless communication service is used to prompt a user to select a corresponding device (the wearable device or a terminal) to process content of the remote wireless communication service, so that the wearable device activates the modem according to a selection instruction of the user, and receives, by using the turned-on modem, the content, transmitted by the terminal, of the remote wireless communication service. According to the method in this embodiment of the present invention, the wearable device may flexibly use, according to a status of the modem, a different manner of receiving the content of the remote wireless communication service, and may determine, according to the selection instruction of the user, whether to turn on the modem, which prevents the modem of the wearable device from always being in a state of receiving the content, sent by a network device, of the remote wireless communication service, that is, prevents the modem from always being in a standby state or a working state, thereby reducing power consumption of the wearable device and prolonging a standby time of the wearable device.

Figure 4:
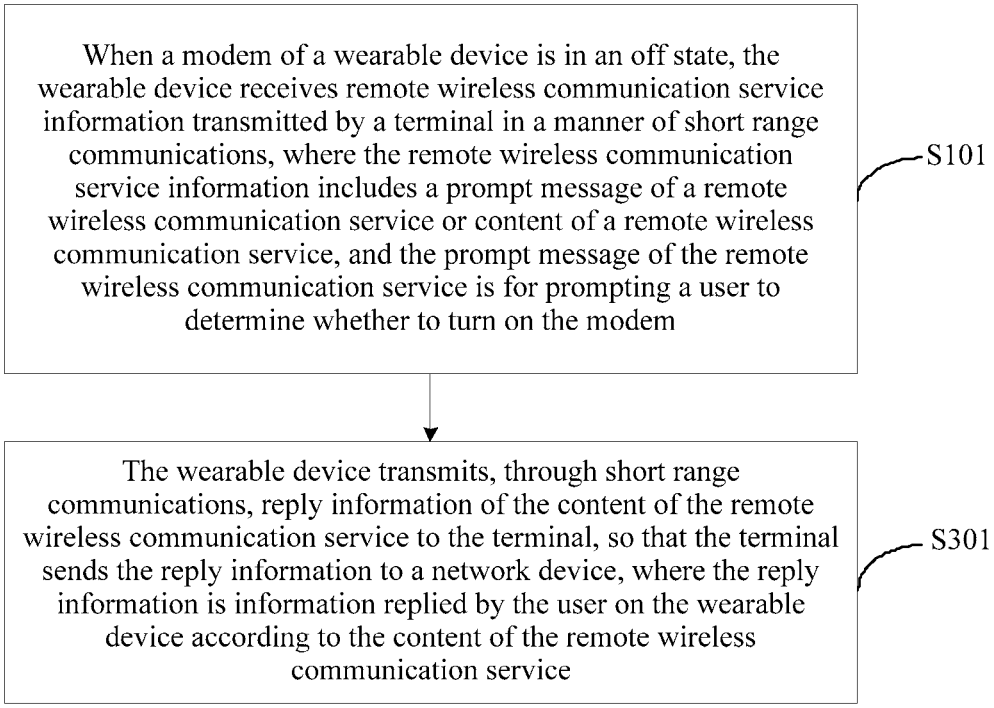
FIG. 4 is a schematic flowchart of Embodiment 3 of a power consumption control method for a wearable device according to the present invention.

FIG. 4 is a schematic flowchart of Embodiment 3 of a power consumption control method for a wearable device according to the present invention. This embodiment relates to a specific process in which, when a modem of a wearable device is in an off state and when the foregoing remote wireless communication service information is content of a remote wireless communication service, the wearable device sends reply information to a terminal according to the content of the remote wireless communication service. On the basis of the foregoing embodiment, further, as shown in FIG. 4, after the foregoing S101, the method includes the following step:

S301: The wearable device transmits, through the short range communications, reply information of the content of the remote wireless communication service to the terminal, so that the terminal sends the reply information to a network device, where the reply information is information replied by the user on the wearable device according to the content of the remote wireless communication service.

Specifically, after the wearable device receives, when the modem is in the off state, the content that is of the remote wireless communication service and that is transmitted by the terminal through the short range communications, optionally, the wearable device may turn on the modem to process the content of the remote wireless communication service, or may not turn on the modem and instead process the content of the remote wireless communication service by using a service processor, so as to obtain the reply information of the content of the remote wireless communication service. The reply information may be the information replied by the user for the content of the remote wireless communication service on the wearable device. For example, when the content of the remote wireless communication service is a short message service message, the reply information is information that is replied by the user for the short message service message on the wearable device and that is processed by the wearable device.

The wearable device may send the reply information to the terminal through the short range communications, so that the terminal sends the reply information to the network device, further enabling the network device to perform next processing.

It should be noted that the foregoing content that is of the remote wireless communication service, that is transmitted by the terminal through the short range communications, and that is received by the wearable device when the modem is in the off state may be sent by the network device to the terminal according to an information transfer setting of the wearable device, which may be specifically: the wearable device notifies the network device to send, to the terminal, the content that is of the remote wireless communication service and that should be originally sent to the wearable device; or the wearable device notifies, by using the terminal, the network device to send, to the terminal, the content that is of the remote wireless communication service and that should be originally sent to the wearable device. Optionally, when the wearable device and the terminal have different identities, the wearable device may send an identity of the terminal to the network device, so that the network device sends, to the terminal according to the identity of the terminal, the content that is of the remote wireless communication service and that should be originally sent to the wearable device.

According to the power consumption control method for a wearable device provided in this embodiment of the present invention, after content that is of a remote wireless communication service and that is transmitted by a terminal through short range communications is received when a modem of a wearable device is in an off state, information replied by a user for the content of the remote wireless communication service on the wearable device is sent to the terminal, so that the terminal sends the replied information to a network device. According to the method in this embodiment of the present invention, the wearable device may flexibly use, according to a status of the modem, a different manner of receiving the content of the remote wireless communication service, and may flexibly send the replied information to the network device, which prevents the modem of the wearable device from always being in a state of receiving the content, sent by the network device, of the remote wireless communication service, that is, prevents the modem from always being in a standby state or a working state, thereby reducing power consumption of the wearable device and prolonging a standby time of the wearable device.

Figure 5:
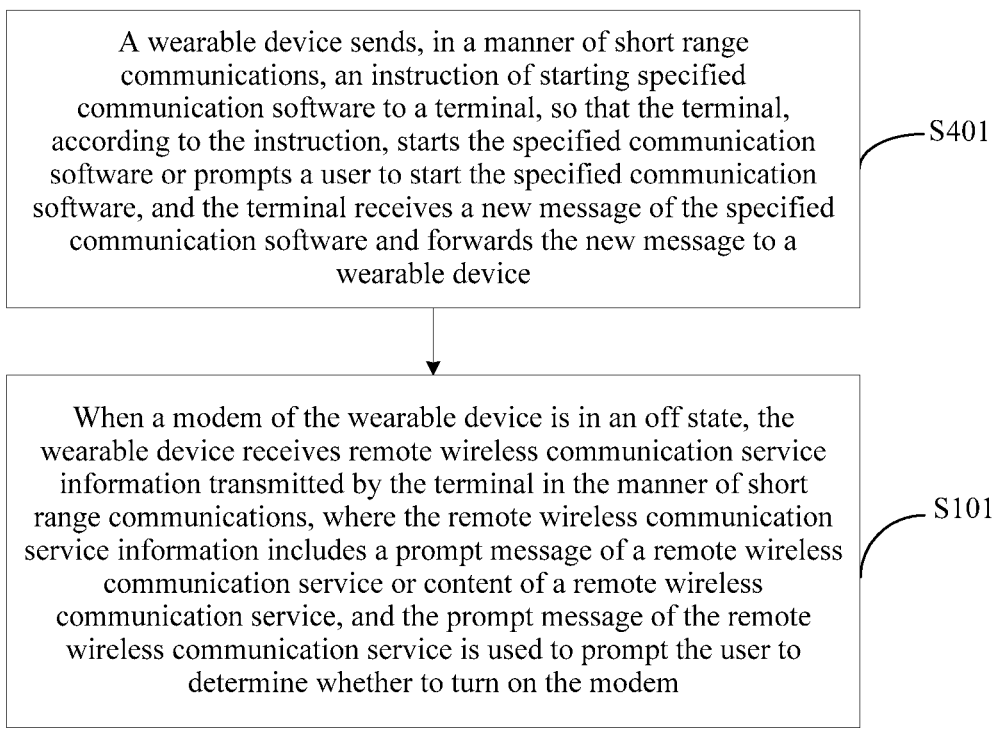
FIG. 5 is a schematic flowchart of Embodiment 4 of a power consumption control method for a wearable device according to the present invention.

FIG. 5 is a schematic flowchart of Embodiment 4 of a power consumption control method for a wearable device according to the present invention. This embodiment relates to a specific process in which a wearable device instructs a terminal to start specified communication software and obtains a new message of the specified communication software. On the basis of any one of the foregoing embodiments shown in FIG. 1 to FIG. 4, further, before the foregoing S101, the method further includes the following step:

S401: The wearable device sends, through the short range communications, an instruction of starting specified communication software to the terminal, to instruct the terminal to start, according to the instruction, the specified communication software or to prompt the user to start the specified communication software, so the terminal receives a new message of the specified communication software and forwards the new message to the wearable device.

Specifically, when the modem is in the off state, the wearable device may send, through the short range communications, the instruction of starting the specified communication software to the terminal. Optionally, the specified communication software may be application software such as WeChat, QQ, or Microblog, or may be other software. After the terminal receives the instruction of starting the specified communication software, the terminal may automatically start the specified communication software, or may prompt the user to start the specified communication software on the terminal.

After the specified communication software on the terminal is started, the terminal may obtain the new message of the specified communication software and forward the new message to the wearable device. Optionally, the new message may be a software update message of the specified communication software.

In this embodiment, the content that is of the remote wireless communication service, that is transmitted by the terminal through the short range communications, and that is received by the wearable device when the modem is in the off state may be an instant communication service that is entered by the user on the foregoing specified communication software or another service that is related to the specified communication software and that is entered by the user on the foregoing specified communication software. In addition, the content of the remote wireless communication service may be sent by a network device to the terminal according to a user name of registered communication software, and then transparently transmitted by the terminal to the network device.

According to the power consumption control method for a wearable device provided in this embodiment of the present invention, when a modem of a wearable device is in an off state, the wearable device sends, through short range communications, an instruction of starting specified communication software to a terminal, so that the terminal, according to the instruction, starts the specified communication software or prompts a user to start the specified communication software, and the terminal forwards a received new message of the specified communication software to the wearable device. According to the method in this embodiment of the present invention, the wearable device may, according to a status of the modem, start the specified communication software on the terminal and obtain the new message of the specified communication software, which not only may flexibly control a service on the specified communication software on the terminal, but also may prevent the modem of the wearable device from always being in a state of receiving content, sent by a network device, of a remote wireless communication service, that is, prevent the modem from always being in a standby state or a working state, thereby reducing power consumption of the wearable device and prolonging a standby time of the wearable device.

Embodiment 5 of the present invention provides a schematic flowchart of a power consumption control method for a wearable device. This embodiment relates to a specific process in which a terminal transmits, when a modem of a wearable device is in an off state, remote wireless communication service information to the wearable device through short range communications. The method includes: transmitting, by the terminal and through the short range communications, remote wireless communication service information to the wearable device whose modem is in an off state, where the remote wireless communication service information includes a prompt message of a remote wireless communication service or content of a remote wireless communication service, and the prompt message of the remote wireless communication service is used to prompt a user to determine whether to turn on the modem.

Specifically, in this embodiment, when the modem of the wearable device is in the off state, there is a communication connection between the wearable device and the terminal. Optionally, the wearable device may establish the communication connection with the terminal in advance and then deactivate the modem; or the wearable device may deactivate the modem and establish the communication connection with the terminal simultaneously. The foregoing communication connection between the wearable device and the terminal may be a near field communication connection (or a short range communications connection), for example, a near field communication connection established, by using the terminal as a WiFi hotspot, by the wearable device with the terminal by using a WiFi function; or a near field communication connection established by the wearable device with the terminal by means of Bluetooth pairing; or a near field communication connection established by the wearable device with the terminal by using a Zigbee protocol. In conclusion, the wearable device can establish the communication connection with the terminal by using any one of near field communication technologies, and transparent transmission of a data service can be implemented between the wearable device and the terminal. The foregoing manner of short range communications may be a Bluetooth communication manner, may be a WiFi or NFC communication manner, or may be another near field communication manner.

When the modem of the wearable device is in the off state, the terminal may detect a status of the modem of the wearable device, or the wearable device notifies the terminal of a current status of the modem in the manner of short range communications. After the terminal knows that the modem of the wearable device is in the off state, the terminal may notify a network device to send, to the terminal, the content that is of the remote wireless communication service and that should be originally sent to the wearable device; or when the modem of the wearable device is not turned off, the wearable device notifies a network device to send, to the terminal, the content that is of the remote wireless communication service and that should be originally sent to the wearable device.

After receiving the content of the remote wireless communication service and knowing that the modem of the wearable device is in the off state, the terminal transmits the remote wireless communication service information to the wearable device in the manner of short range communications, where the remote wireless communication service information includes the content of the remote wireless communication service or the prompt message of the remote wireless communication service, and the prompt message of the remote wireless communication service is used to prompt the user to determine whether to turn on the modem and is used to notify the wearable device of content, currently received by the terminal, of the remote wireless communication service. The user may select to turn on the modem so that the content of the remote wireless communication service is processed on the wearable device, or the user may select not to turn on the modem so that the content of the remote wireless communication service is processed on the terminal. In another aspect, in this embodiment, when the modem of the wearable device is in an on state, the modem may receive the content, sent by the network device, of the remote wireless communication service.

According to the power consumption control method for a wearable device provided in this embodiment of the present invention, a terminal transmits, when a modem of a wearable device is in an off state, remote wireless communication service information to the wearable device through short range communications, which prevents the modem of the wearable device from always being in a state of receiving content, sent by a network device, of a remote wireless communication service, that is, prevents the modem from always being in a standby state or a working state, thereby reducing power consumption of the wearable device and prolonging a standby time of the wearable device.

On the basis of the embodiment shown in FIG. 5, Embodiment 6 relates to a specific process in which, when a modem of a wearable device is in an off state and when the foregoing remote wireless communication service information is a prompt message of a remote wireless communication service, a terminal sends content of the remote wireless communication service to the wearable device. The foregoing prompt information that is of the remote wireless communication service and that is sent by the terminal to the wearable device is used to enable the wearable device to turn on the modem according to a selection instruction entered by a user, and process, by using the modem, the content, received by the wearable device, of the remote wireless communication service, where the selection instruction is an instruction for selectively activating the modem that is entered by the user according to the prompt message of the remote wireless communication service.

Specifically, when the modem of the wearable device is in the off state, the terminal may transmit the prompt message of the remote wireless communication service to the wearable device through short range communications, to prompt the user to determine whether to turn on the modem, and to notify the wearable device of content, currently received by the terminal, of the remote wireless communication service. According to the prompt message of the remote wireless communication service, the user may select to process the content of the remote wireless communication service on the wearable device, or select to process the content of the remote wireless communication service on the terminal. Optionally, the prompt message of the remote wireless communication service may be a message carrying an option control for the user to select.

When the user selects to process the content of the remote wireless communication service on the wearable device, the user enters the selection instruction to the wearable device. Optionally, the selection instruction is related to an operation of the user. For example, it is assumed that the foregoing prompt message of the remote wireless communication service is a pop-up dialog box. Referring to FIG. 3, the dialog box includes two selection controls. After the user taps a different control, a different selection instruction is entered to the wearable device. When the user taps a control 1, a selection instruction that the user enters to the wearable device is used to instruct the wearable device to turn on the modem.

After activating the modem, the wearable device may receive the content of the remote wireless communication service by using the modem. Optionally, the content of the remote wireless communication service may be a wireless service such as an incoming call, a short message service message, or a multimedia messaging service message.

According to the power consumption control method for a wearable device provided in this embodiment of the present invention, when a modem of a wearable device is in an off state, a terminal transmits, through short range communications, a prompt message of a remote wireless communication service to the wearable device, to prompt a user to select a corresponding device (the wearable device or a terminal) to process content of the remote wireless communication service, so that the wearable device activates the modem according to a selection instruction of the user and receives, by using the turned-on modem, the content, transmitted by the terminal, of the remote wireless communication service. According to the method in this embodiment of the present invention, the terminal may flexibly use, according to a status of the modem, a different manner of sending the content of the remote wireless communication service, so that the wearable device may determine, according to the selection instruction of the user, whether to turn on the modem, which prevents the modem of the wearable device from always being in a state of receiving the content, sent by a network device, of the remote wireless communication service, that is, prevents the modem from always being in a standby state or a working state, thereby reducing power consumption of the wearable device and prolonging a standby time of the wearable device.

Figure 6:
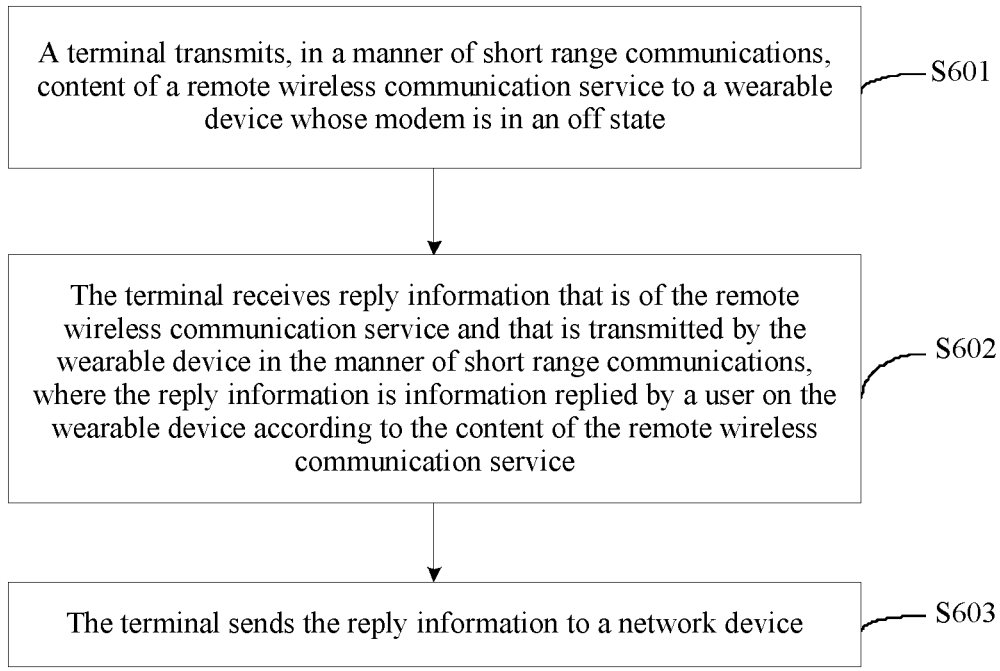
FIG. 6 is a schematic flowchart of Embodiment 7 of a power consumption control method for a wearable device according to the present invention.

FIG. 6 is a schematic flowchart of Embodiment 7 of a power consumption control method for a wearable device according to the present invention. This embodiment relates to a specific process in which, when a modem of a wearable device is in an off state and when the foregoing remote wireless communication service information is content of a remote wireless communication service, a terminal receives reply information sent by the wearable device for the content of the remote wireless communication service. As shown in FIG. 6, the method includes the following steps:

S601: A terminal transmits, through short range communications, content of a remote wireless communication service to the wearable device whose modem is in an off state.

S602: The terminal receives reply information that is of the remote wireless communication service and that is transmitted by the wearable device through the short range communications, where the reply information is information replied by a user on the wearable device according to the content of the remote wireless communication service.

Specifically, after the wearable device receives, when the modem is in the off state, the content that is of the remote wireless communication service and that is transmitted by the terminal through the short range communications, optionally, the wearable device may turn on the modem to process the content of the remote wireless communication service, or may not turn on the modem and instead process the content of the remote wireless communication service by using a service processor, so as to obtain the reply information of the content of the remote wireless communication service. The reply information may be the information replied by the user for the content of the remote wireless communication service on the wearable device. For example, when the content of the remote wireless communication service is a short message service message, the reply information is information that is replied by the user for the short message service message on the wearable device and that is processed by the wearable device. Then, the wearable device may send the reply information to the terminal through the short range communications.

S603: The terminal sends the reply information to a network device.

It should be noted that the foregoing content that is of the remote wireless communication service, that is transmitted by the terminal through the short range communications, and that is received by the wearable device when the modem is in the off state may be sent by the network device to the terminal according to an information transfer setting of the wearable device, which may be specifically: the wearable device notifies the network device to send, to the terminal, the content that is of the remote wireless communication service and that should be originally sent to the wearable device; or the wearable device notifies, by using the terminal, the network device to send, to the terminal, the content that is of the remote wireless communication service and that should be originally sent to the wearable device. Optionally, when the wearable device and the terminal have different identities, the wearable device may send an identity of the terminal to the network device, so that the network device sends, to the terminal according to the identity of the terminal, the content that is of the remote wireless communication service and that should be originally sent to the wearable device; or the wearable device may send, by using the terminal, an identity of the terminal to the network device, so that the network device sends, to the terminal according to the identity of the terminal, the content that is of the remote wireless communication service and that should be originally sent to the wearable device.

According to the power consumption control method for a wearable device provided in this embodiment of the present invention, after a terminal transmits, when a modem of a wearable device is in an off state, content of a remote wireless communication service to the wearable device through short range communications, the terminal receives reply information sent by the wearable device for the content of the remote wireless communication service, and sends the reply information to a network device. According to the method in this embodiment of the present invention, the terminal may flexibly use, according to a status of the modem, a different manner of sending the content of the remote wireless communication service, so as to obtain the reply information sent by the wearable device for the content of the remote wireless communication service, and send the reply information to the network device, which prevents the modem of the wearable device from always being in a state of receiving the content, sent by the network device, of the remote wireless communication service, that is, prevents the modem from always being in a standby state or a working state, thereby reducing power consumption of the wearable device and prolonging a standby time of the wearable device.

Figure 7:
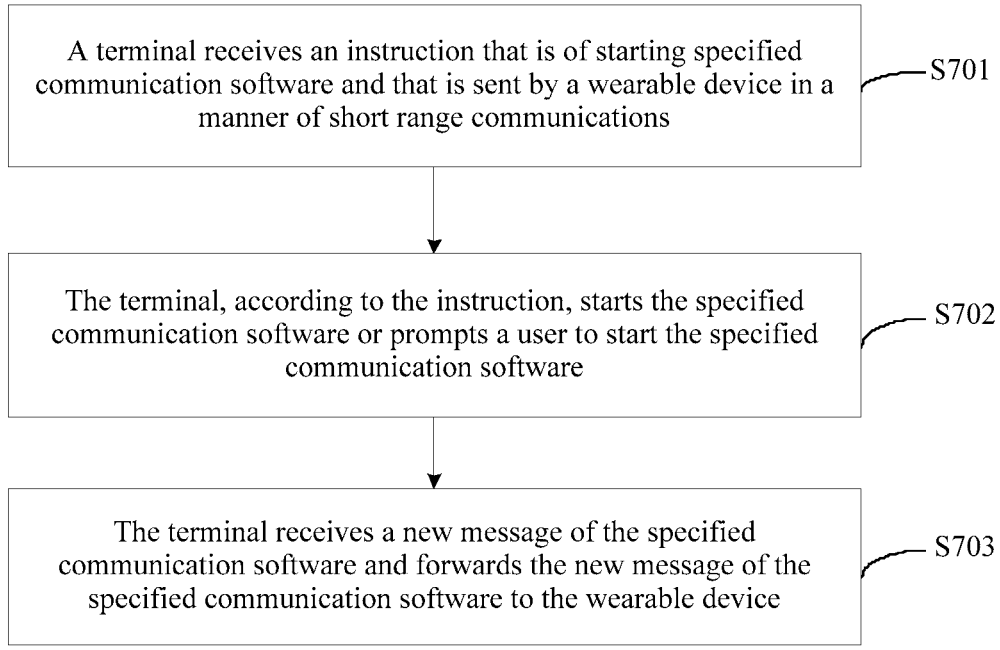
FIG. 7 is a schematic flowchart of Embodiment 8 of a power consumption control method for a wearable device according to the present invention.

FIG. 7 is a schematic flowchart of Embodiment 8 of a power consumption control method for a wearable device according to the present invention. This embodiment relates to a specific process in which a terminal starts, according to an instruction, from a wearable device, of starting specified communication software, the specified communication software, and sends an obtained new message of the specified communication software to the wearable device. On the basis of any one of the foregoing Embodiment 5 to Embodiment 7, further, before the foregoing S601, the method further includes the following steps:

S701: The terminal receives an instruction that is of starting specified communication software and that is sent by the wearable device through the short range communications.

S702: The terminal, according to the instruction, starts the specified communication software or prompts a user to start the specified communication software.

Specifically, when the modem is in the off state, the wearable device may send, through the short range communications, the instruction of starting the specified communication software to the terminal. Optionally, the specified communication software may be application software such as WeChat, QQ, or Microblog, or may be other software After the terminal receives the instruction of starting the specified communication software, the terminal may automatically start the specified communication software, or may prompt the user to start the specified communication software on the terminal.

S703: The terminal receives a new message of the specified communication software and forwards the new message of the specified communication software to the wearable device.

Specifically, after the specified communication software on the terminal is started, the terminal may obtain the new message of the specified communication software and forward the new message to the wearable device. Optionally, the new message may be a software update message of the specified communication software.

In this embodiment, the content, that is of the remote wireless communication service and that is transmitted by the terminal to the wearable device through the short range communications when the modem of the wearable device is in the off state may be an instant communication service (for example, an instant communication message) entered by the user on the foregoing specified communication software or another service that is related to the specified communication software and that is entered by the user on the foregoing specified communication software. In addition, the content of the remote wireless communication service may be sent by a network device to the terminal according to a user name of registered communication software, and then transparently transmitted by the terminal to the network device.

According to the power consumption control method for a wearable device provided in this embodiment of the present invention, when a modem of a wearable device is in an off state, a terminal receives an instruction that is of starting specified communication software and that is sent by the wearable device through short range communications; and according to the instruction, starts the specified communication software or prompts a user to start the specified communication software, so that the terminal forwards a received new message of the specified communication software to the wearable device. According to the method in this embodiment of the present invention, the terminal may forward the new message of the specified communication software to the wearable device whose modem is in the off state, which prevents the modem of the wearable device from always being in a state of receiving content, sent by a network device, of a remote wireless communication service, that is, prevents the modem from always being in a standby state or a working state, thereby reducing power consumption of the wearable device and prolonging a standby time of the wearable device.

Persons of ordinary skill in the art may understand that all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes: any medium that can store program code, such as a ROM, a RAM, a magnetic disk, or an optical disc.

Figure 8:
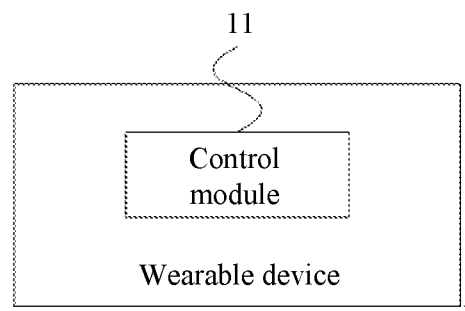
FIG. 8 is a schematic structural diagram of Embodiment 1 of a wearable device according to the present invention.

FIG. 8 is a schematic structural diagram of Embodiment 1 of a wearable device according to the present invention. As shown in FIG. 8, the wearable device may include a control module 11.

The control module 11 is configured to control, when a modem of the wearable device is in an off state, a receiver to receive remote wireless communication service information transmitted by a terminal through short range communications, where the remote wireless communication service information includes a prompt message of a remote wireless communication service or content of a remote wireless communication service, and the prompt message of the remote wireless communication service is used to prompt a user to determine whether to turn on the modem; and is further configured to control, when the modem of the wearable device is in an on state, the receiver to receive the content, sent by a network device, of the remote wireless communication service.

The wearable device provided in this embodiment of the present invention may execute the foregoing method embodiments, implementation principles and technical effects thereof are similar, and details are not described herein.

Figure 9:
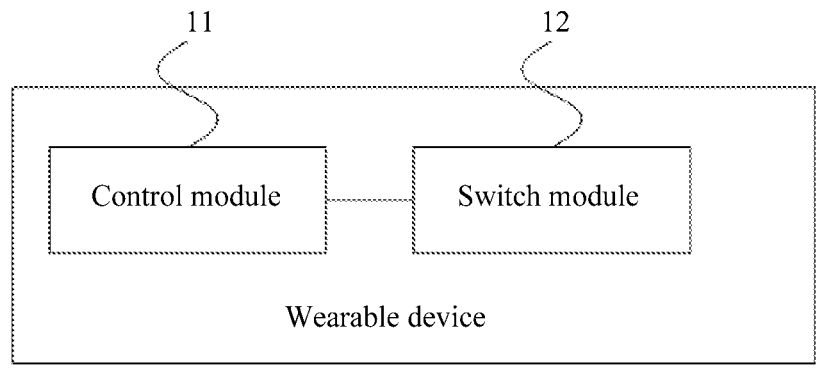
FIG. 9 is a schematic structural diagram of Embodiment 2 of a wearable device according to the present invention.

FIG. 9 is a schematic structural diagram of Embodiment 2 of a wearable device according to the present invention. In this embodiment, the remote wireless communication service information includes the prompt message of the remote wireless communication service. On the basis of the foregoing embodiment shown in FIG. 8, as shown in FIG. 9, the wearable device may further include a switch module 12.

Specifically, the switch module 12 is configured to: after the control module 11 controls, when the modem of the wearable device is in the off state, the receiver to receive the remote wireless communication service information transmitted by the terminal through the short range communications, turn on the modem according to a selection instruction entered by the user, where the selection instruction is an instruction for selectively activating the modem that is entered by the user according to the prompt information of the remote wireless communication service; and the control module 11 is specifically configured to control the modem to process the content, received by the receiver, of the remote wireless communication service.

The wearable device provided in this embodiment of the present invention may execute the foregoing method embodiments, implementation principles and technical effects thereof are similar, and details are not described herein.

Optionally, when the remote wireless communication service information includes the content of the remote wireless communication service, the control module 11 is further configured to: after controlling, when the modem of the wearable device is in the off state, the receiver to receive the remote wireless communication service information transmitted by the terminal through the short range communications, control a transmitter to transmit, through the short range communications, reply information of the content of the remote wireless communication service to the terminal, so that the terminal sends the reply information to the network device, where the reply information is information replied by the user on the wearable device according to the content of the remote wireless communication service.

Optionally, the control module 11 is further configured to: before controlling, when the modem of the wearable device is in the off state, the receiver to receive the remote wireless communication service information transmitted by the terminal through the short range communications, control the transmitter to send, through the short range communications, an instruction of starting specified communication software to the terminal, to instruct the terminal to start, according to the instruction, the specified communication software or to prompt the user to start the specified communication software, so the terminal receives a new message of the specified communication software and forwards the new message to the wearable device.

Optionally, the content of the remote wireless communication service is sent by the network device to the terminal according to an information transfer setting of the wearable device.

Optionally, the content of the remote wireless communication service is sent by the network device to the terminal according to a user name of registered communication software.

The wearable device provided in this embodiment of the present invention may execute the foregoing method embodiments, implementation principles and technical effects thereof are similar, and details are not described herein.

Figure 10:
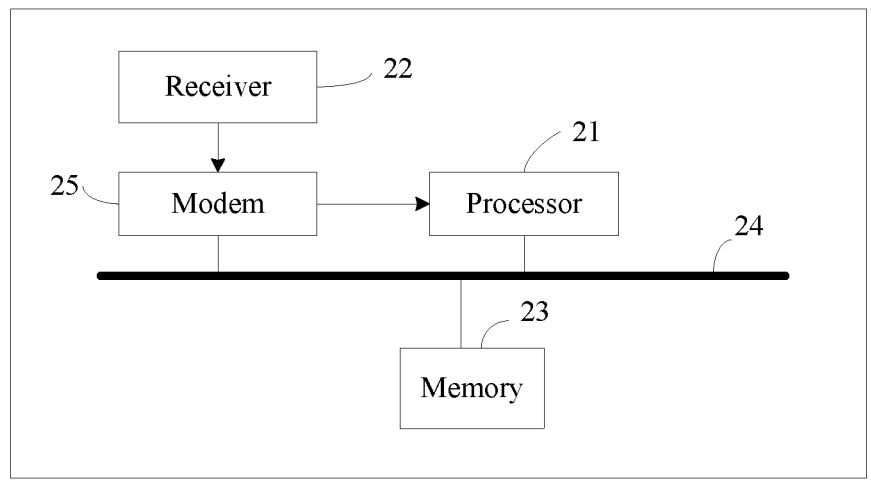
FIG. 10 is a schematic structural diagram of Embodiment 3 of a wearable device according to the present invention.

FIG. 10 is a schematic structural diagram of Embodiment 3 of a wearable device according to the present invention. As shown in FIG. 10, the wearable device may include a processor 21, a receiver 22, a memory 23, at least one communications bus 24, and a modem 25. The communications bus 24 is configured to implement a communication connection between components. The memory may include a high speed RAM memory, or may include a non-volatile memory NVM, for example, at least one magnetic disk memory. The memory 23 may store various programs used to complete various processing functions and implement methods and steps of the embodiments. The modem 25 is configured to perform modulation processing on a digital signal or demodulation processing on an analog signal.

Specifically, in this embodiment, the processor 21 is configured to control, when the modem 25 of the wearable device is in an off state, the receiver 22 to receive remote wireless communication service information transmitted by a terminal through short range communications, where the remote wireless communication service information includes a prompt message of a remote wireless communication service or content of a remote wireless communication service, and the prompt message of the remote wireless communication service is used to prompt a user to determine whether to turn on the modem 25; and the processor 21 is further configured to control, when the modem 25 of the wearable device is in an on state, the receiver 22 to receive the content, sent by a network device, of the remote wireless communication service.

The wearable device provided in this embodiment of the present invention may execute the foregoing method embodiments, implementation principles and technical effects thereof are similar, and details are not described herein.

In a possible implementation manner of this embodiment of the present invention, when the remote wireless communication service information includes the prompt message of the remote wireless service, the processor 21 is further configured to: after controlling, when the modem 25 of the wearable device is in the off state, the receiver 22 to receive the remote wireless communication service information transmitted by the terminal through the short range communications, turn on the modem 25 according to a selection instruction entered by the user, where the selection instruction is an instruction for selectively activating the modem 25 that is entered by the user according to the prompt information of the remote wireless communication service; and the processor 21 is specifically configured to control the modem 25 to process the content, received by the receiver 22, of the remote wireless communication service.

Figure 11:
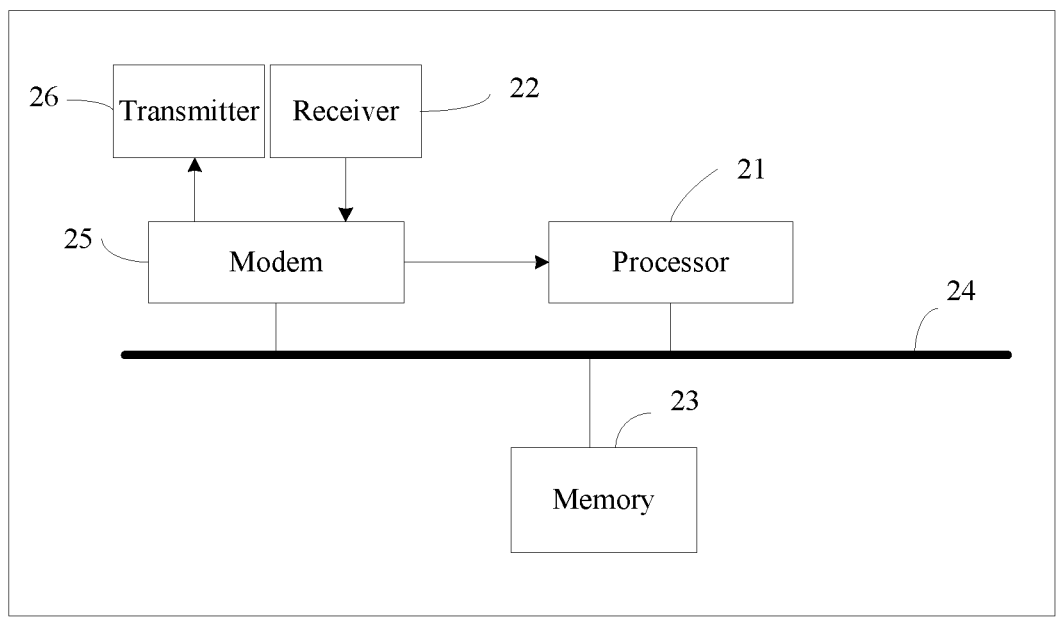
FIG. 11 is a schematic structural diagram of Embodiment 4 of a wearable device according to the present invention.

FIG. 11 is a schematic structural diagram of Embodiment 4 of a wearable device according to the present invention. In this embodiment, the remote wireless communication service information includes the content of the remote wireless communication service. On the basis of the foregoing embodiment shown in FIG. 10, as shown in FIG. 11, the wearable device may further include a transmitter 26.

Specifically, the processor 21 is further configured to: after controlling, when the modem 25 of the wearable device is in the off state, the receiver 22 to receive the remote wireless communication service information transmitted by the terminal through the short range communications, control the transmitter 26 to transmit, through the short range communications, reply information of the content of the remote wireless communication service to the terminal, so that the terminal sends the reply information to the network device, where the reply information is information replied by the user on the wearable device according to the content of the remote wireless communication service.

On the basis of the foregoing embodiment, the processor 21 is further configured to: before controlling, when the modem 25 of the wearable device is in the off state, the receiver 22 to receive the remote wireless communication service information transmitted by the terminal through the short range communications, control the transmitter 26 to send, through the short range communications, an instruction of starting specified communication software to the terminal, to instruct the terminal to start, according to the instruction, the specified communication software or to prompt the user to start the specified communication software, so the terminal receives a new message of the specified communication software and forwards the new message to the wearable device.

Optionally, the content of the remote wireless communication service is sent by the network device to the terminal according to an information transfer setting of the wearable device.

Optionally, the content of the remote wireless communication service is sent by the network device to the terminal according to a user name of registered communication software.

The wearable device provided in this embodiment of the present invention may execute the foregoing method embodiments, implementation principles and technical effects thereof are similar, and details are not described herein.

Figure 12:
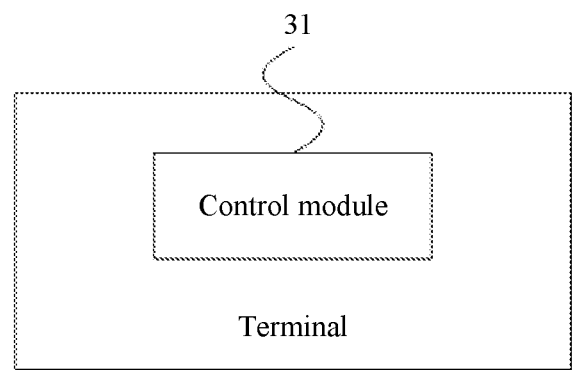
FIG. 12 is a schematic structural diagram of Embodiment 1 of a terminal according to the present invention.

FIG. 12 is a schematic structural diagram of Embodiment 1 of a terminal according to the present invention. As shown in FIG. 12, the terminal includes a control module 31, configured to control a transmitter to transmit, through short range communications, remote wireless communication service information to a wearable device whose modem is in an off state, where the remote wireless communication service information includes a prompt message of a remote wireless communication service or content of a remote wireless communication service, and the prompt message of the remote wireless communication service is used to prompt a user to determine whether to turn on the modem.

The terminal provided in this embodiment of the present invention may execute the foregoing method embodiments, implementation principles and technical effects thereof are similar, and details are not described herein.

In a possible implementation manner of this embodiment of the present invention, further, the foregoing prompt information of the remote wireless communication service is used to enable the wearable device to turn on the modem according to a selection instruction entered by the user, and process, by using the modem, the content, received by the wearable device, of the remote wireless communication service, where the selection instruction is an instruction for selectively activating the modem that is entered by the user according to the prompt message of the remote wireless communication service.

In another possible implementation manner of this embodiment of the present invention, in this embodiment, when the remote wireless communication service information includes the content of the remote wireless communication service, the control module 31 is further configured to: after controlling the transmitter to transmit, through the short range communications, the remote wireless communication service information to the wearable device whose modem is in the off state, control a receiver to receive reply information that is of the remote wireless communication service and that is transmitted by the wearable device through the short range communications, where the reply information is information replied by the user on the wearable device according to the content of the remote wireless communication service; and is configured to control the transmitter to send the reply information to a network device.

Figure 13:
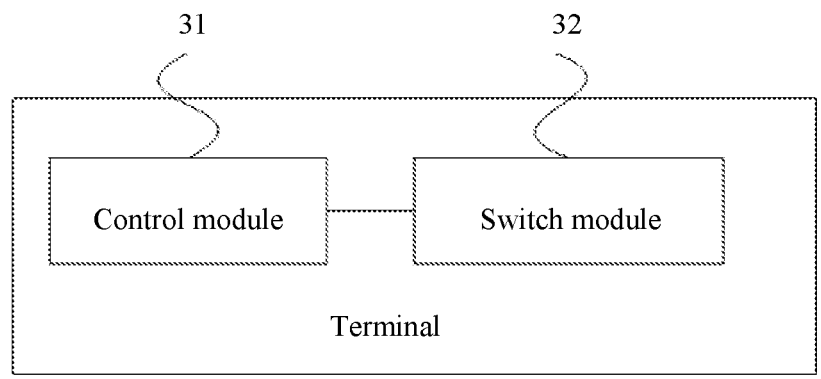
FIG. 13 is a schematic structural diagram of Embodiment 2 of a terminal according to the present invention.

FIG. 13 is a schematic structural diagram of Embodiment 2 of a terminal according to the present invention. On the basis of the foregoing embodiment shown in FIG. 12, further, the terminal may further include a switch module 32, where the control module 31 is further configured to: before controlling the transmitter to transmit, through the short range communications, the remote wireless communication service information to the wearable device whose modem is in the off state, control the receiver to receive an instruction that is of starting specified communication software and that is sent by the wearable device through the short range communications;

the switch module 32 is configured to, according to the instruction, start the specified communication software or prompt the user to start the specified communication software; and the control module 31 is further configured to control the receiver to receive a new message of the specified communication software, and control the transmitter to forward the new message of the specified communication software to the wearable device.

Optionally, the content of the remote wireless communication service is sent by the network device to the terminal according to an information transfer setting of the wearable device.

Optionally, the content of the remote wireless communication service is sent by the network device to the terminal according to a user name of registered communication software.

The terminal provided in this embodiment of the present invention may execute the foregoing method embodiments, implementation principles and technical effects thereof are similar, and details are not described herein.

Figure 14:
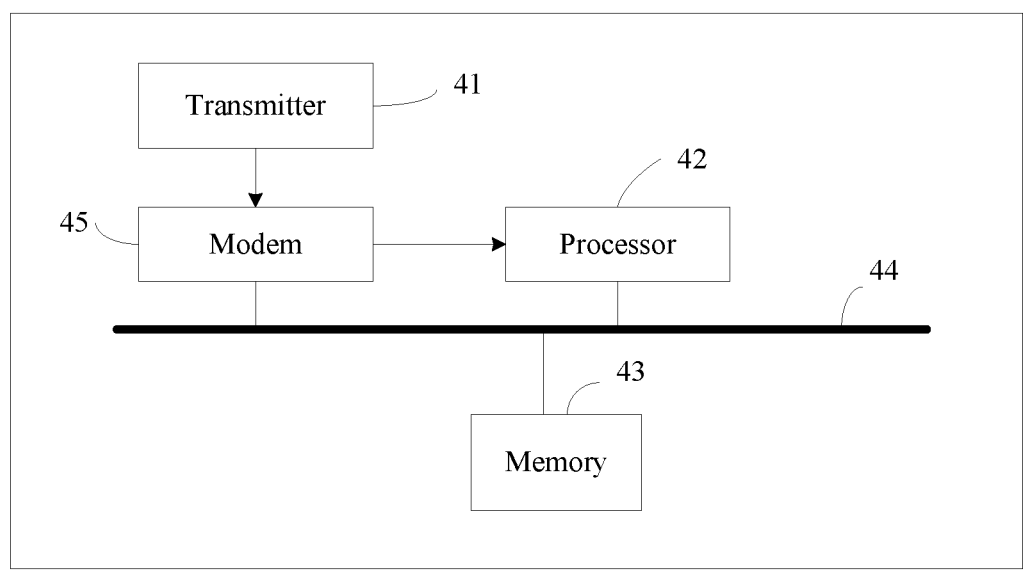
FIG. 14 is a schematic structural diagram of Embodiment 3 of a terminal according to the present invention.

FIG. 14 is a schematic structural diagram of Embodiment 3 of a terminal according to the present invention. As shown in FIG. 14, the terminal includes a transmitter 41, a processor 42, a memory 43, at least one communications bus 44, and a modem 45. The communications bus 44 is configured to implement a communication connection between components. The memory 43 may include a high speed RAM memory, or may include a non-volatile memory NVM, for example, at least one magnetic disk memory. The memory 43 may store various programs used to complete various processing functions and implement methods and steps of the embodiments. The modem 45 is configured to perform modulation processing on a digital signal or demodulation processing on an analog signal.

Specifically, in this embodiment, the processor 42 is configured to control the transmitter 41 to transmit, through short range communications, remote wireless communication service information to a wearable device whose modem 45 is in an off state, where the remote wireless communication service information includes a prompt message of a remote wireless communication service or content of a remote wireless communication service, and the prompt message of the remote wireless communication service is used to prompt a user to determine whether to turn on the modem 45.

The terminal provided in this embodiment of the present invention may execute the foregoing method embodiments, implementation principles and technical effects thereof are similar, and details are not described herein.

In a possible implementation manner of this embodiment of the present invention, the prompt information of the remote wireless communication service is used to enable the wearable device to turn on the modem 45 according to a selection instruction entered by the user, and process, by using the modem 45, the content, received by the wearable device, of the remote wireless communication service, where the selection instruction is an instruction for selectively activating the modem 45 that is entered by the user according to the prompt message of the remote wireless communication service.

Figure 15:
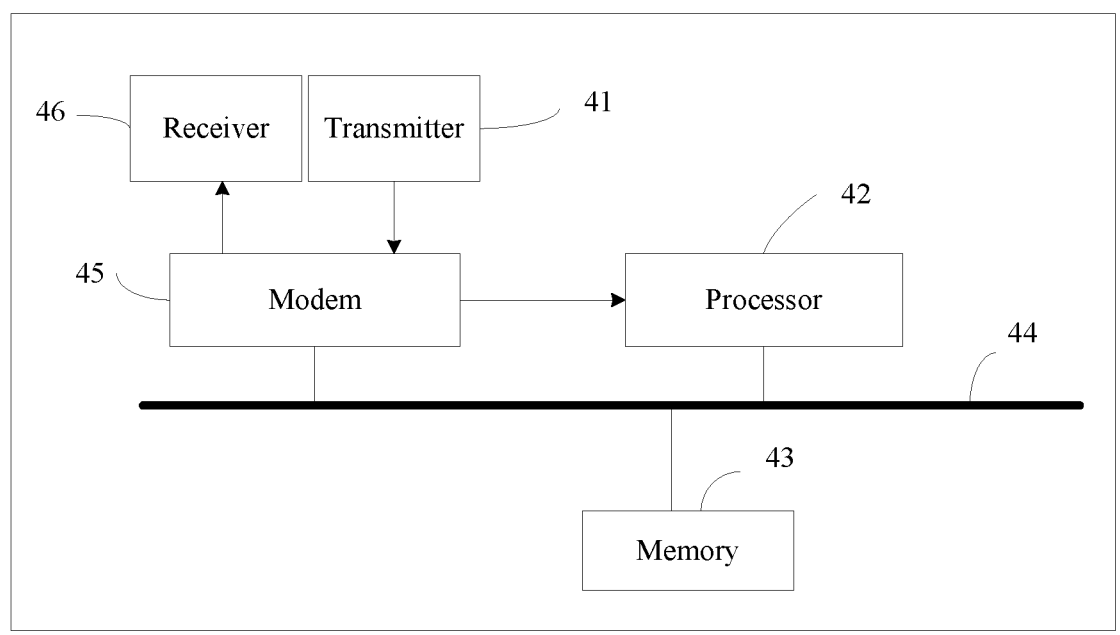
FIG. 15 is a schematic structural diagram of Embodiment 4 of a terminal according to the present invention.

FIG. 15 is a schematic structural diagram of Embodiment 4 of a terminal according to the present invention. In this embodiment, the remote wireless communication service information includes the content of the remote wireless communication service. On the basis of the foregoing embodiment shown in FIG. 14, further, the terminal may further include a receiver 46, where the processor 42 is further configured to: after controlling the transmitter 41 to transmit, through the short range communications, the remote wireless communication service information to the wearable device whose modem 45 is in the off state, control the receiver 46 to receive reply information that is of the remote wireless communication service and that is transmitted by the wearable device through the short range communications, where the reply information is information replied by the user on the wearable device according to the content of the remote wireless communication service; and the processor 42 is further configured to control the transmitter 41 to send the reply information to a network device.

On the basis of the foregoing embodiment, the processor 42 is further configured to: before controlling the transmitter 41 to transmit, through the short range communications, the remote wireless communication service information to the wearable device whose modem 45 is in the off state, control the receiver 46 to receive an instruction that is of starting specified communication software and that is sent by the wearable device through the short range communications; and is further configured to: according to the instruction, start the specified communication software or prompt the user to start the specified communication software, and control the receiver 46 to receive a new message of the specified communication software and control the transmitter 41 to forward the new message of the specified communication software to the wearable device.

Optionally, the content of the remote wireless communication service is sent by the network device to the terminal according to an information transfer setting of the wearable device.

Optionally, the content of the remote wireless communication service is sent by the network device to the terminal according to a user name of registered communication software.

The terminal provided in this embodiment of the present invention may execute the foregoing method embodiments, implementation principles and technical effects thereof are similar, and details are not described herein.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A communication system, comprising a smart watch and a mobile phone, the smart watch comprising a modem that is configured to perform wireless communication, wherein the modem of the smart watch in an on state is configured to receive an incoming call or content of a wireless communication service from a base station, and wherein the smart watch is configured to:
turn off the modem in response to a short range communication connection between the smart watch and the mobile phone; and, wherein the mobile phone is configured to:
receive, from the base station, content of the wireless communication service; and
transmit, via the short range communication connection, a prompt message or the content of the wireless communication service to the smart watch, the prompt message being configured to prompt a user to turn on the modem of the smart watch;

the smart watch is further configured to:
receive, via the short range communication connection between the mobile phone and the smart watch with the modem in an off state, the prompt message or the content of the wireless communication service;
in response to the prompt message, turn on the modem according to a selection instruction entered by the user on the smart watch; and
receive and process the content of the wireless communication service;

the smart watch with the modem in the off state is further configured to:
send, by the smart watch, to the mobile phone, an instruction to start a specified communication software via the short range communication connection, the specified communication software is installed on the mobile phone but not running on the mobile phone before the instruction is received by the mobile phone; and the mobile phone is further configured to:
start the specified communication software or prompt the user to start the specified communication software according to the instruction.

2. The system according to claim 1, wherein the short range communication connection is a Bluetooth connection established by a Bluetooth circuit of the smart watch.

3. The system according to claim 1, wherein the short range communication connection is a WiFi connection established by a WiFi circuit of the smart watch.

4. The system according to claim 1, wherein the wireless communication service comprises an incoming call, a short message, or a multimedia messaging.

5. The system according to claim 1, wherein the smart watch is further configured to:
send, via the short range communication connection with the modem in the off state, a reply information to the mobile phone, the reply information being responsive to the content of the wireless communication service; and the mobile phone is further configured to:
send the reply information to the base station.

6. The system according to claim 1, wherein the smart watch further comprises a service processor integrating a WiFi circuit, and/or a Bluetooth circuit.

7. The system according to claim 1, wherein the mobile phone is further configured to:
notify the base station to send the content of the wireless communication service to the mobile phone after knowing that the modem of the smart watch is in the off state, the content being designated to be originally sent to the smart watch.

8. The system according to claim 1, wherein
an identity of the mobile phone is sent to the base station to facilitate the base station sending the content to the mobile phone according to the identity of the mobile phone, the content being designated to be originally sent to the smart watch.

9. The system according to claim 1, wherein the smart watch and the mobile phone have different identities.

10. The system according to claim 1, wherein the mobile phone is further configured to:
receive a new message of the specified communication software; and
forward the new message to the smart watch with the modem in the off state via the short range communication connection.

11. The system according to claim 1, wherein the mobile phone is further configured to:
receive, from the base station, the content of the wireless communication service according to an information transfer setting of the smart watch.

12. The system according to claim 1, wherein the mobile phone is further configured to:
receive, from the base station, the content of the wireless communication service according to a user name of the specified communication software.

13. A smart watch, comprising:
a modem configured to perform wireless communication;
one or more processors;
a memory configured to store one or more programs, wherein the one or more programs are configured to be executed by the one or more processors, the one or more programs comprising instructions configured to:
turn on the modem, wherein the modem in an on state is configured to receive an incoming call or content of a wireless communication service from a base station;
turn off the modem in response to a short range communication connection between the smart watch and a mobile phone;
receive via the short range communication connection between the mobile phone and the smart watch with the modem in an off state, a prompt message of the wireless communication service or the content of the wireless communication service, the prompt message being configured to prompt a user to turn on the modem;
in response to the prompt message, turn on the modem according to a selection instruction entered by the user on the smart watch; and
receive and process the content of the wireless communication service by the smart watch;
wherein the one or more programs further comprising instructions configured to:
send, by the smart watch, to the mobile phone, an instruction of starting a specified communication software via the short range communication connection, the specified communication software is installed on the mobile phone but not running on the mobile phone before the instruction is received by the mobile phone; and
receive, via the short range communication connection, a new message of the specified communication software sent by the mobile phone.

14. The smart watch according to claim 13, wherein the short range communication connection is a Bluetooth connection established by a Bluetooth circuit of the smart watch.

15. The smart watch according to claim 13, wherein the short range communication connection is a WiFi connection established by a WiFi circuit of the smart watch.

16. The smart watch according to claim 13, wherein the wireless communication service comprises an incoming call, a short message, or a multimedia messaging.

17. The smart watch according to claim 13, wherein the one or more programs further comprising instructions configured to: send, via the short range communication connection with the modem in the off state, a reply information to the mobile phone, wherein the reply information is responsive to the content of the wireless communication service.

18. The smart watch according to claim 13, an identity of the mobile phone is sent to the base station to facilitate the base station sending the content to the mobile phone according to the identity of the mobile phone, the content being designated to be originally sent to the smart watch.

19. The smart watch according to claim 13, wherein the smart watch and the mobile phone have different identities.

* * * * *